United States Patent
Ashiba

(10) Patent No.: US 8,157,065 B2
(45) Date of Patent: Apr. 17, 2012

(54) SHOCK ABSORBER

(75) Inventor: Masahiro Ashiba, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 342 days.

(21) Appl. No.: 12/472,635

(22) Filed: May 27, 2009

(65) Prior Publication Data

US 2009/0294232 A1 Dec. 3, 2009

(30) Foreign Application Priority Data

May 30, 2008 (JP) .................................. 2008-142867

(51) Int. Cl.
*F16F 9/34* (2006.01)
(52) U.S. Cl. ................. 188/322.15; 188/282.6
(58) Field of Classification Search ............... 188/282.5, 188/282.6, 322.13, 322.15, 322.22
See application file for complete search history.

(56) References Cited

U.S. PATENT DOCUMENTS

| | | | | |
|---|---|---|---|---|
| 4,905,799 A | * | 3/1990 | Yamaoka et al. | 188/322.15 |
| 5,226,512 A | * | 7/1993 | Kanari | 188/282.2 |
| 5,259,294 A | * | 11/1993 | May | 92/181 P |
| 6,644,445 B2 | * | 11/2003 | Dodge | 188/282.6 |

FOREIGN PATENT DOCUMENTS

JP 2-195039 8/1990

* cited by examiner

*Primary Examiner* — Bradley King
*Assistant Examiner* — Nicholas J Lane
(74) *Attorney, Agent, or Firm* — Wenderoth, Lind & Ponack, LLP

(57) ABSTRACT

A hydraulic shock absorber has a cylinder having a hydraulic fluid sealed therein and a piston connected with a piston rod and slidably provided in the cylinder. The piston is provided with a circular main seat portion to form a main valve chamber communicating with an extension passage. Arcuate sub-seat portions are provided in concentric relation to the main seat portion to form sub-valve chambers. A disk valve is seated on the main and sub-seat portions to form clearances between them that always communicate between the main and sub-valve chambers. The disk valve opens upon receiving the pressure in the main and sub-valve chambers. The clearances restrict the flow of hydraulic fluid flowing out through the sub-valve chambers at the beginning of opening of the disk valve to prevent a sharp change in damping force. The concentric arrangement of the main and sub-seat portions facilitates the setting of an initial deflection for the disk valve.

17 Claims, 4 Drawing Sheets

SHOCK ABSORBER

BACKGROUND OF THE INVENTION

The present invention relates to shock absorbers that utilize a fluid pressure.

In general, cylinder-type hydraulic shock absorbers attached to suspension systems of automobiles or other vehicles are structured as follows. A piston connected with a piston rod is slidably provided in a cylinder having a hydraulic fluid sealed therein. The piston and the piston rod constitute in combination a piston assembly that is provided with a damping force generating mechanism including an orifice and a disk valve. The damping force generating mechanism generates a damping force by controlling, through the orifice and the disk valve, the flow of hydraulic fluid induced by sliding movement of the piston in the cylinder, which is caused by the extension and contraction of the piston rod.

When the piston speed is low (i.e. in a low piston speed region), the orifice generates a damping force of orifice characteristics (in which the damping force is approximately proportional to the square of the piston speed). When the piston speed is intermediate (i.e. in an intermediate piston speed region), the disk valve deflects to open according to the piston speed, thereby generating a damping force of valve characteristics (in which the damping force is approximately proportional to the piston speed). When the piston speed is high (i.e. in a high piston speed region), the amount of deflection of the disk valve increases up to a certain critical piston speed; therefore, the valve characteristics are maintained. When the critical piston speed is exceeded, the disk valve no longer deflects, and the flow path area is kept constant. Therefore, the orifice characteristics again become dominant. The critical piston speed can be adjusted by varying the cross-sectional area (flow path area) of a passage provided in the piston (piston passage), or by limiting the maximum amount of deflection of the disk valve.

In FIG. 5, the broken line shows the damping force characteristics obtained by a hydraulic shock absorber according to the related art. The related art apparatus enables damping force characteristics to be set for each of the low, intermediate and high piston speed regions. For the low piston speed region, damping force characteristics are set on the basis of the orifice area. For the intermediate piston speed region, damping force characteristics are set on the basis of the flexural rigidity of the disk valve when and after it has opened. For the high piston speed region, damping force characteristics are set on the basis of the flexural rigidity of the disk valve after it has opened, or based on the cross-sectional area (flow path area) of a passage provided in the piston.

One example of the related art is disclosed in Japanese Patent Application Publication No. Hei 2-195039. According to the related art technique, the disk valve is allowed to open stepwise by devising the shape of the disk valve seat and the configuration of disks constituting the disk valve, thereby suppressing a sharp change in damping force.

It is desirable that hydraulic shock absorbers be capable of reducing sharp changes in damping force characteristics and enable damping force characteristics to be set relatively easily.

SUMMARY OF THE INVENTION

Accordingly, an object of the present invention is to provide a shock absorber capable of reducing sharp changes in damping force and enabling damping force characteristics to be set relatively easily.

The present invention provides a shock absorber including a cylinder having a fluid sealed therein, a piston slidably provided in the cylinder, a piston rod connected to the piston and extending out of the cylinder, a passage in which a flow of fluid is induced by sliding movement of the piston in the cylinder, and a damping force generating mechanism having a disk valve provided in the passage. The damping force generating mechanism includes a valve body provided with an opening of the passage, and a circular main seat portion projecting from the valve body to surround the opening. The main seat portion forms a main valve chamber communicating directly with the passage. The disk valve is seated on the main seat portion. The damping force generating mechanism further includes a sub-seat portion projecting from the valve body toward the disk valve at the inner peripheral side of the main seat portion. The sub-seat portion forms, in cooperation with the main seat portion, a sub-valve chamber partitioned from the opening. Further, the damping force generating mechanism includes a pressing member that presses the disk valve toward the main seat portion at the inner peripheral side of the main seat portion.

DETAILED DESCRIPTION OF THE INVENTION

An embodiment of the present invention will be described below in detail with reference to the accompanying drawings.

Figure 3:
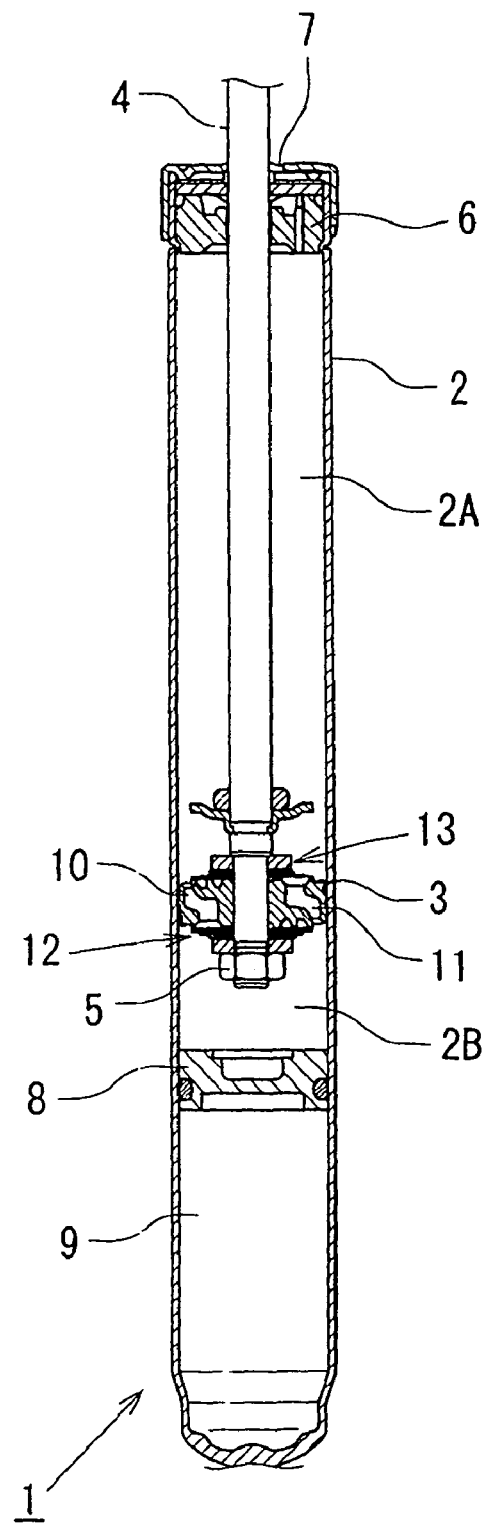
FIG. 3 is a vertical sectional view of the hydraulic shock absorber.

FIG. 3 is a general view showing the overall structure of a shock absorber according to this embodiment. A piston assembly as a main part of the shock absorber is shown in enlarged view in FIG. 1. As shown in FIG. 3, the shock absorber 1 according to this embodiment is a single-cylinder type hydraulic shock absorber attached to a suspension system of an automobile. In the shock absorber 1, a piston 3 functioning as a valve body is slidably provided in a cylinder 2 having a fluid sealed therein. A piston rod 4 extends to the outside of the cylinder 2 through a sealing device comprising a rod guide 6 and an oil seal 7 provided at an end of the cylinder 2. One end of the piston rod 4 is connected to the vehicle body outside the cylinder 2. The other end of the piston rod 4 is secured to the piston 3 with a nut 5 inside the cylinder 2. The interior of the cylinder 2 is divided by the piston 3 into two chambers, i.e. a cylinder upper chamber 2A and a cylinder lower chamber 2B. The interior of the cylinder 2 has a structure in which the fluid filling the insides of the two chambers moves in and out of them through passages 10 and 11 formed in the piston 3. This structure can damp vibrations transmitted from the cylinder 2 to the piston rod 4. In this embodiment, a hydraulic fluid for hydraulic shock absorbers is used as the above-described fluid. A free piston 8 is slidably fitted in the bottom portion of the cylinder 2 to form a gas chamber 9. The compression and expansion of a high-pressure gas sealed in the gas chamber 9 allows a volumetric change in the cylinder 2 due to extension and contraction of the piston rod 4.

Figure 1:
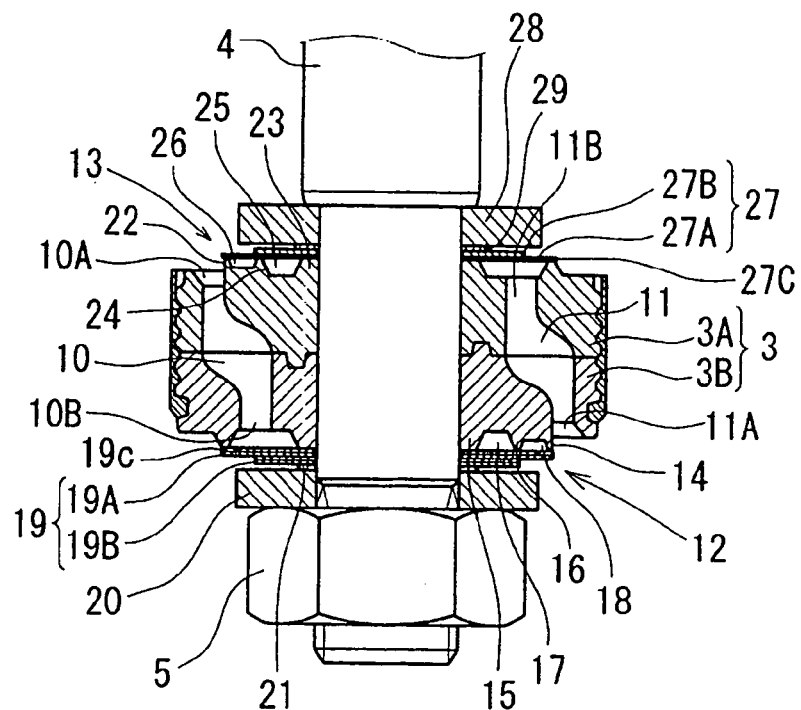
FIG. 1 is an enlarged vertical sectional view showing a piston assembly that is a main part of a hydraulic shock absorber according to an embodiment of the present invention.
Figure 2:
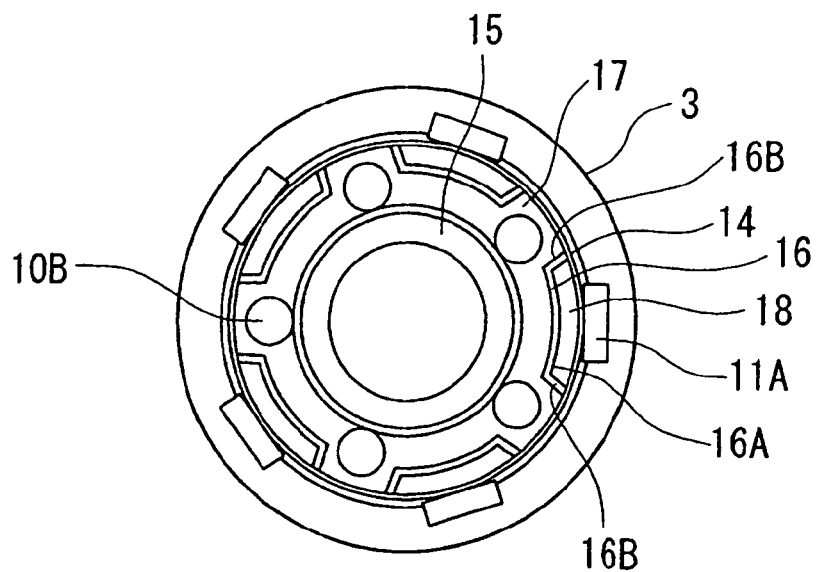
FIG. 2 is a bottom view of a piston of the hydraulic shock absorber shown in FIG. 1.

As shown in FIG. 1, the piston 3 comprises a plurality of axially split parts. It should be noted that the piston 3 in this embodiment has a split structure comprising two axially split parts, i.e. a piston half 3A and a piston half 3B. The two piston halves 3A and 3B are provided with one and the other passages for communication between the above-described cylinder upper and lower chambers 2A and 2B. In this embodiment, the one passage is an extension passage 10, and the other passage is a compression passage 11. The upper end of the extension passage 10 has an opening 10A opening on an outer peripheral portion of the upper end surface of the piston 3. The opening 10A has substantially the same configuration as that of an opening 11A (shown in FIG. 2) that will be explained below. The opening 10A has a substantially rectangular shape, and a plurality of them are disposed along the circumferential direction. In this embodiment, five openings 10A are provided at substantially equal spaces along the circumferential direction. The lower end of the passage 10 has an opening 10B opening on the lower end surface of the piston 3. The opening 10B opens at a position closer to the center than the opening 10A and an opening 11A explained below. In this embodiment, the opening 10B is substantially circular in shape. As shown in FIG. 2, a plurality of openings 10B are disposed along the circumferential direction. In this embodiment, five openings 10B are disposed at substantially equal spaces along the circumferential direction.

The lower end of the compression passage 11, which is the other passage, has an opening 11A opening on an outer peripheral portion of the lower end surface of the piston 3. The opening 11A has a substantially rectangular shape as shown in FIG. 2. A plurality of openings 11A are disposed along the circumferential direction. In this embodiment, five openings 11A are disposed at substantially equal spaces along the circumferential direction. The upper end of the compression passage 11 has an opening 11B which opens on the upper end surface of the piston 3. The opening 11B opens at a position radially closer to the center than the openings 11A and 10A. The opening 11B is substantially circular in shape in the same way as the openings 10B shown in FIG. 2. A plurality of openings 11B are disposed along the circumferential direction. In this embodiment, five openings 11B are disposed at substantially equal spaces along the circumferential direction. It should be noted that the openings 10A and 11A may have an arcuate shape. The lower end of the piston 3 is provided with an extension damping force generating mechanism 12 that generates a damping force by controlling the flow of hydraulic fluid in the extension passage 10 induced by sliding movement of the piston 3 in the cylinder 2. The upper end of the piston 3 is provided with a compression damping force generating mechanism 13 that generates a damping force by controlling the flow of hydraulic fluid in the compression passage 11 induced by sliding movement of the piston 3 in the cylinder 2. The extension and compression damping force generating mechanisms 12 and 13 generate a damping force by controlling the flow of hydraulic fluid through adjustment of the respective flow path areas of the extension and compression passages 10 and 11 with the valve body and the disks.

Figure 4:
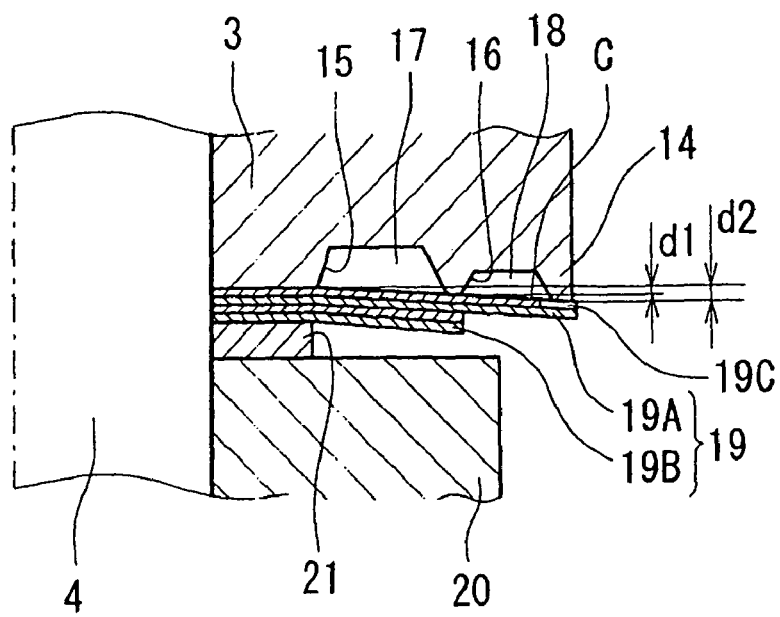
FIG. 4 is an enlarged vertical sectional view of an extension damping force generating mechanism of the hydraulic shock absorber.

Let us explain the extension damping force generating mechanism 12 with reference to FIGS. 2 and 4 in addition to FIG. 1. The piston 3 has a circular main seat portion 14 provided on its lower end surface. The main seat portion 14 projects downward as seen in FIG. 1. The main seat portion 14 extends adjacent to the inner peripheral sides of the openings 11A of the compression passage 11 and surrounds the openings 10B of the extension passage 10. An annular clamp portion 15 projects downward (in FIG. 1) at the inner peripheral side of the openings 10B of the extension passage 10 in concentric relation to the main seat portion 14. In addition, sub-seat portions 16 project downward (in FIG. 1) between the main seat portion 14 and the clamp portion 15 at respective positions each between a pair of mutually adjacent openings 10B of the extension passage 10. Each sub-seat portion 16 is formed from an arcuate portion 16A extending in concentric relation to the main seat portion 14 and the clamp portion 15 and radial portions 16B extending radially outward from the circumferentially opposite ends of the arcuate portion 16A and connected to the inner periphery of the main seat portion 14. The openings 10B are provided to lie on a circle formed by the arcuate portions 16A and their extensions. Although in this embodiment the main seat portion 14 is circular in shape, it may be elliptic or oval, provided that it is possible to implement the operations of the embodiment, which will be described later.

An annular main valve chamber 17 is formed between the main seat portion 14 and the clamp portion 15. The annular main valve chamber 17 is in communication with the extension passage 10. Substantially sectorial sub-valve chambers 18 are formed in the main valve chamber 17 by the sub-seat portions 16. In this embodiment, as shown in FIG. 4, the sub-seat portions 16 project higher than the clamp portion 15. The main seat portion 14 projects higher than the sub-seat portions 16. The sub-seat portions 16 have a uniform projection height throughout the arcuate and radial portions 16A and 16B and hence have a height difference between themselves and the main seat portion 14. The respective projection heights of the clamp portion 15, the sub-seat portions 16 and the main seat portion 14 are preferably set to increase in the order mentioned. It is, however, only necessary that the projection height of the main seat portion 14 be higher than that of at least the clamp portion 15. The projection height of the sub-seat portions 16 may be lower than that of the clamp portion 15. Further, in this embodiment, the clamp portion 15 projects relative to the main valve chamber 17. The clamp portion 15, however, need not always project relative to the main valve chamber 17. Further, the disk valve 19 does not necessarily need to be clamped, provided that the inner peripheral portion of the disk valve 19 can be deflected to close the openings 10B by pressing the inner side of the disk valve 19 against the valve body. In this embodiment, the disk valve pressing mechanism comprises a nut 5, a disk valve 19, a stopper 20, and a spacer 21. In the present invention, however, not all of them but at least the nut 5 is needed. That is, it is only necessary to be able to deflect the inner peripheral portion of the disk valve 19.

The circular disk valve 19 is seated on the main seat portion 14 and the sub-seat portions 16. The disk valve 19 is clamped at its inner peripheral portion between the clamp portion 15 on the one hand and the stopper 20 and the spacer 21 on the other by tightening of the nut 5. The disk valve 19 has an initial deflection applied thereto by the projection height difference d1 between the clamp portion 15 and the sub-seat portions 16 and the projection height difference d2 between the clamp portion 15 and the main seat portion 14. As a result of the initial deflection being applied to the disk valve 19 in this way, substantially triangular clearances C serving as restrictors are formed between the radial portions 16B at the opposite ends of each sub-seat portion 16, the inner side of the main seat portion 14 and the disk valve 19. Thus, the sub-valve chambers 18 and the main valve chamber 17 are always in communication with each other through the substantially triangular clearances C.

The disk valve 19 comprises a large-diameter disk 19A seated on the main seat portion 14 and the sub-seat portions 16 and a small-diameter disk 19B superimposed on the large-diameter disk 19A and used as a spring member having substantially the same diameter as that of the inner periphery of each sub-seat portion 16. The large-diameter disk 19A has a cut portion 19C formed in the outer peripheral portion thereof that abuts against the main seat portion 14. The cut portion 19C functions as an orifice. The disk valve 19 is deflected to lift (open) from the main seat portion 14 and the sub-seat portions 16 by the pressure of hydraulic fluid in the main valve chamber 17 and the sub-valve chambers 18. Thus, the disk valve 19 adjusts the flow path area of the extension passage 10 according to the degree of opening thereof to generate a damping force. The cut portion 19C of the large-diameter disk 19A always allows the extension passage 10 to communicate with the cylinder lower chamber 2B.

As has been stated above the sub-valve chambers 18 are always communicated with the main valve chamber 17 through the substantially triangular clearances C. Therefore, the cut portion 19C of the large-diameter disk 19A can always communicate the extension passage 10 with the cylinder lower chamber 2B regardless of the installation position of the large-diameter disk 19A in the direction of rotation. That is, even if the cut portion 19C is positioned to face one sub-valve chamber 18, the extension passage 10 is always communicated with the cylinder lower chamber 2B through the main valve chamber 17, the clearances C, the sub-valve chamber 18 and the cut portion 19C. It should be noted that the orifice characteristics are influenced to a considerable extent by a part of the flow path that has the smallest sectional area; therefore, the total of the areas of two clearances C at the opposite sides of each sub-valve chamber 18 should preferably be set larger than the sectional area of the cut portion 19C as seen from the radially outer side thereof. With this arrangement, the cut portion 19C provides the smallest sectional area in the flow path regardless of the position of the cut portion 19C in the direction of rotation. Thus, it is possible to reduce the change in the orifice characteristics depending on the position of the cut portion 19C.

In the above-described embodiment, the clearances C always provide communication between the sub-valve chambers 18 and the main valve chamber 17. In this regard, the large-diameter disk 19A may be deformed to close the clearances C when a high back pressure acts thereon. Such a situation, however, does not come under the definition of the term "always" as used in the present invention.

The compression damping force generating mechanism 13 has an arrangement similar to that of the above-described extension damping force generating mechanism 12. That is, a main seat portion 22, a clamp portion 23 and sub-seat portions 24 project from the upper end surface of the piston 3. With this structure, a main valve chamber 25 and sub-valve chambers 26 are formed. The compression damping force generating mechanism 13 has a disk valve 27 comprising a large-diameter disk 27A and a small-diameter disk 27B. The large-diameter disk 27A is provided with a cut portion 27C that function as an orifice. The disk valve 27 is clamped between the clamp portion 23 on the one hand and a stopper 28 and a spacer 29 on the other by tightening of the nut 5. The disk valve 27 has an initial deflection applied thereto by the projection height difference between the clamp portion 23 and the sub-seat portions 24 and the projection height difference between the clamp portion 23 and the main seat portion 22. As a result of the initial deflection being applied to the disk valve 27 in this way, clearances (substantially triangular clearances in this embodiment) are formed between the radial portions of at the opposite sides of each sub-seat portion 24, the inner side of the main seat portion 22 and the disk valve 27. The disk valve 27 is deflected to lift (open) from the main seat portion 22 and the sub-seat portions 24 by the pressure of hydraulic fluid in the main valve chamber 25 and the sub-valve chambers 26. Thus, the disk valve 27 adjusts the flow path area of the compression passage 11 according to the degree of opening thereof. The cut portion 27C of the large-diameter disk 27A always allows the compression passage 11 to communicate with the cylinder upper chamber 2A.

The following is an explanation of the operation of this embodiment arranged as stated above.

During the extension stroke of the piston rod 4, the sliding movement of the piston 3 in the cylinder 2 pressurizes and causes the hydraulic fluid in the cylinder upper chamber 2A to flow toward the cylinder lower chamber 2B mainly through the extension passage 10. Thus, the extension damping force generating mechanism 12 generates a damping force.

In the low piston speed region, a damping force of orifice characteristics is generated by the cut portion 19C of the disk valve 19 and the cut portion 27C of the disk valve 27. The damping force characteristics obtained in the low piston speed region are shown in a region A1 of the graph in FIG. 5. At this time, the pressure in the main valve chamber 17 and that in the sub-valve chambers 18 are substantially the same (because the main valve chamber 17 and the sub-valve chambers 18 are in communication with each other through the clearances C). Because the pressure in the main valve chamber 17 and the sub-valve chambers 18 has not yet reached the valve-opening pressure of the disk valve 19, the disk valve 19 does not open.

When the piston speed increases and shifts to the intermediate piston speed region, the pressure in the main valve chamber 17 and the sub-valve chambers 18 reaches the valve-opening pressure of the disk valve 19. Consequently, the disk valve 19 opens to generate a damping force of valve characteristics. At this time, the main valve chamber 17 and the sub-valve chambers 18 are under the same pressure, or static pressure, before the disk valve 19 opens because the main valve chamber 17 and the sub-valve chambers 18 are communicated with each other through the substantially triangular clearances C. Therefore, the disk valve 19 lifts (opens) from the main seat portion 14 substantially simultaneously over the entire circumference thereof. The large-diameter disk 19A has the inner peripheral portion thereof increased in flexural rigidity by the small-diameter disk 19B pressed thereagainst, whereas the outer peripheral portion of the large-diameter disk 19A is easy to deflect. Accordingly, the outer peripheral portion of the large-diameter disk 19A first deflects about the small-diameter disk 19B serving as a fulcrum. Meanwhile, the inner peripheral portion of the large-diameter disk 19A does not deflect and is kept seated on the arcuate portions 16A of the sub-seat portions 16. In this state, although the outer peripheral portion of the disk valve 19 deflects, the area of the substantially triangular clearances C does not increase much. The substantially triangular clearances C then restrict the flow from the main chamber 17 to the sub-valve chambers 18, and a pressure drop occurs at the substantially triangular clearances C. Therefore, the pressure in the sub-valve chambers 18 becomes smaller than that in the main valve chamber 17. Consequently, the force that deflects the disk valve 19 reduces as a whole, and hence the apparent rigidity of the disk valve 19 increases. Accordingly, the slope of the valve characteristics increases. The damping force characteristics obtained at this time are shown by the solid line in a region A2 in FIG. 5. The solid line in region A1 is gentler in slope than the solid line in the region A1. In addition, the amount of deflection of the disk valve 19 becomes larger at the portion thereof facing the sub-valve chambers 18 than at the portion thereof facing the main valve chamber 17, causing the hydraulic fluid to flow directly into the cylinder lower chamber 2B mainly from the main valve chamber 17.

In contrast, if the sub-valve chambers 18 are not provided, the pressure in the main valve chamber 17 is constant throughout independently of the position in the main valve chamber 17. Therefore, the disk valve 19 lifts (opens) from the main seat portion 14 substantially simultaneously over the entire circumference thereof. The damping force characteristics obtained at this time are shown by the broken line in the region A2 of FIG. 5. It should be noted that the main valve chamber 17 and the sub-valve chambers 18 should preferably be always communicated with each other through the substantially triangular clearances C to obtain the characteristics shown in this embodiment. It is, however, possible to obtain characteristics close to those shown in this embodiment even if substantially no clearances C are formed, i.e. even in a state where the large-diameter disk 19A is in contact with substantially the whole radial portions 16B of the sub-seat portions 16 forming the sub-valve chambers 18, by increasing the flexural rigidity of the inner peripheral portion of the large-diameter disk 19A by pressing through the small-diameter disk 19B and making the outer peripheral portion of the large-diameter disk 19A readily deflectable.

When the piston speed further increases to shift to the high piston speed region, the small-diameter disk 19B deflects and the larger-diameter disk 19A further deflects to lift from the sub-seat portions 16 completely. In this state, the main valve chamber 17 and the sub-valve chambers 18 are fully communicated with each other. Therefore, there is no pressure difference between the main and sub-valve chambers 17 and 18. Consequently, the slope of the valve characteristics becomes substantially equal to that in the case where the sub-valve chambers 18 are not provided. The damping force characteristics obtained at this time are shown in a region A3 of FIG. 5. At this time, the amount of deflection of the disk valve 19 is substantially uniform throughout. Therefore, the hydraulic fluid flows out to the cylinder lower chamber 2B more evenly from the main valve chamber 17 and the sub-valve chambers 18.

During the compression stroke of the piston rod 4, the sliding movement of the piston 3 in the cylinder 2 pressurizes and causes the hydraulic fluid in the cylinder lower chamber 2B to flow toward the cylinder upper chamber 2A mainly through the compression passage 11. Thus, the compression damping force generating mechanism 13 generates a damping force.

The damping force changes with the piston speed in the same way as in the case of the above-described extension stroke. In the low piston speed region, a damping force of orifice characteristics is generated by the cut portion 19C of the disk valve 19 and the cut portion 27C of the disk valve 27. When the piston speed shifts to the intermediate piston speed region, the outer peripheral portion of the disk valve 27 deflects to lift (open) from the main seat portion 22 while being kept seated on the sub-seat portions 24 to generate a damping force of valve characteristics having a gentler slope than in the case where the whole disk valve 27 is closed (see A1 in FIG. 5) and having a steeper slope than in the case where the whole disk valve 27 is open (see A3 in FIG. 5). When the piston speed further increases to reach the high piston speed region, the disk valve 27 completely lifts (opens) from the sub-seat portions 24, resulting in a decrease in the slope of the valve characteristics (see A3 in FIG. 5).

Thus, the slope of the damping force of valve characteristics is changed stepwise with the increase in the piston speed, thereby making it possible to suppress a sharp change in damping force and hence possible to prevent generation of noise or degradation of ride quality. In addition, the manufacture is easy because the main seat portions 14 and 22 are circular in shape and the sub-seat portions 16 and 24 have an arcuate shape concentric with the main seat portions 14 and 22. In addition, the stability of damping force characteristics can be increased because an initial load can be readily applied to each of the disk valves 19 and 27 by providing differences in projection height between the main seat portion 14 (22), the sub-seat portions 16 (24) and the clamp portion 15 (23). Further, it is possible to apply an initial load without the need to stack many disks and hence possible to increase the ease of setting damping force characteristics.

In the above-described embodiment, it becomes possible to adjust the valve characteristics in the intermediate piston speed region by interposing, between the large-diameter disk 19A (27A) and the small-diameter disk 19B (27B), a disk having a diameter intermediate between those of the large- and small-diameter disks. It becomes possible to adjust the damping force of valve characteristics in the high piston speed region by further stacking a smaller-diameter disk on the small-diameter disk 19B (27B).

Figure 5:
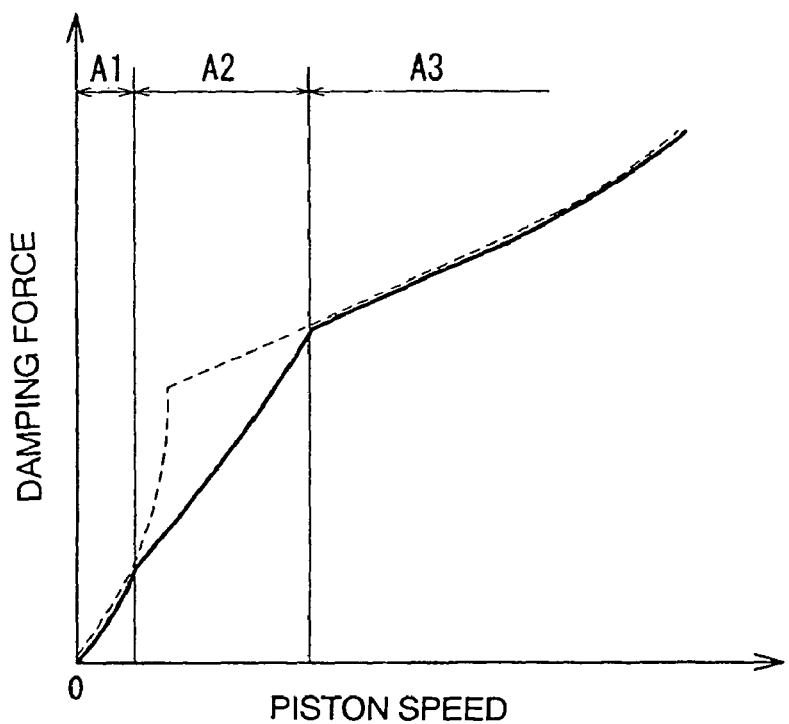
FIG. 5 is a graph showing damping force characteristics of the hydraulic shock absorber.

In the above-described embodiment, damping force characteristics as shown in FIG. 5 can be obtained even if the recesses of the sub-seat portions 16 and 24 that form the sub-valve chambers 18 and 26 are eliminated. It is, however, preferable to provide the recesses in the sub-valve chambers 18 and 26 because the recesses substantially prevent self-excited vibration from occurring and provide a damping effect owing to an increase in the flow path attained by the provision of the recesses. Accordingly, the structure in which the sub-seat portions 16 and 24 have respective recesses provides superior characteristics in terms of stability.

In the above-described embodiment, substantially triangular clearances C are provided to always communicate between the main valve chamber 17 and the sub-valve chambers 18. It is, however, possible to obtain damping force characteristics as shown in FIG. 5 even if the clearances C are not provided, by increasing the flexural rigidity of the inner peripheral portion of the large-diameter disk 19A by pressing through the small-diameter disk 19B and making the outer peripheral portion of the large-diameter disk 19A readily deflectable. It should be noted, however, that the provision of the clearances C enables a damping effect to be obtained owing to an increase in the flow path and makes it possible to obtain superior characteristics in terms of stability.

Although in the above-described embodiment the sub-seat portions 16 are higher in projection height than the clamp portion 15, the projection height of the sub-seat portions 16 may be less than or equal to that of the clamp portion 15 to obtain damping force characteristics as shown in FIG. 5. It is, however, possible to obtain superior characteristics in terms of stability by setting the relation in projection height such that the clamp portion 15<sub-seat portions 16<main seat portion 14. By so doing, the sub-seat portions 16 can be used as fulcrum.

In the above-described embodiment, the small-diameter disk 19B is used as a spring member. In this regard, the damping force characteristics of this embodiment can be obtained without using the spring member. With the structure using the spring member. however, damping force characteristics can be set even more easily.

In the foregoing embodiment, the present invention is applied to damping force generating mechanisms provided in the piston assembly, by way of example. The present invention, however, is not necessarily limited thereto but may be applied to other damping force generating mechanisms. For example, the present invention may be used in a hydraulic shock absorber including a reservoir having a hydraulic fluid and a gas sealed therein. More specifically, the present invention may be applied to a damping force generating mechanism provided in a base valve (valve body) that divides the inside of the cylinder and the reservoir from each other. The present invention may also be applied to damping force generating mechanisms provided in various hydraulic fluid passages. It is, however, preferable to provide a damping force generating mechanism in a piston or a base valve because the structure is simplified by doing so. Further, in the foregoing embodiment, the present invention is applied to a hydraulic shock absorber that generates a damping force by controlling the flow of hydraulic fluid. The present invention, however, is not necessarily limited thereto but may be similarly applied to a shock absorber that generates a damping force by controlling the flow of other fluid, e.g. a gas. The use of a hydraulic fluid, however, makes it possible to obtain superior characteristics in terms of stability.

Figure 6:
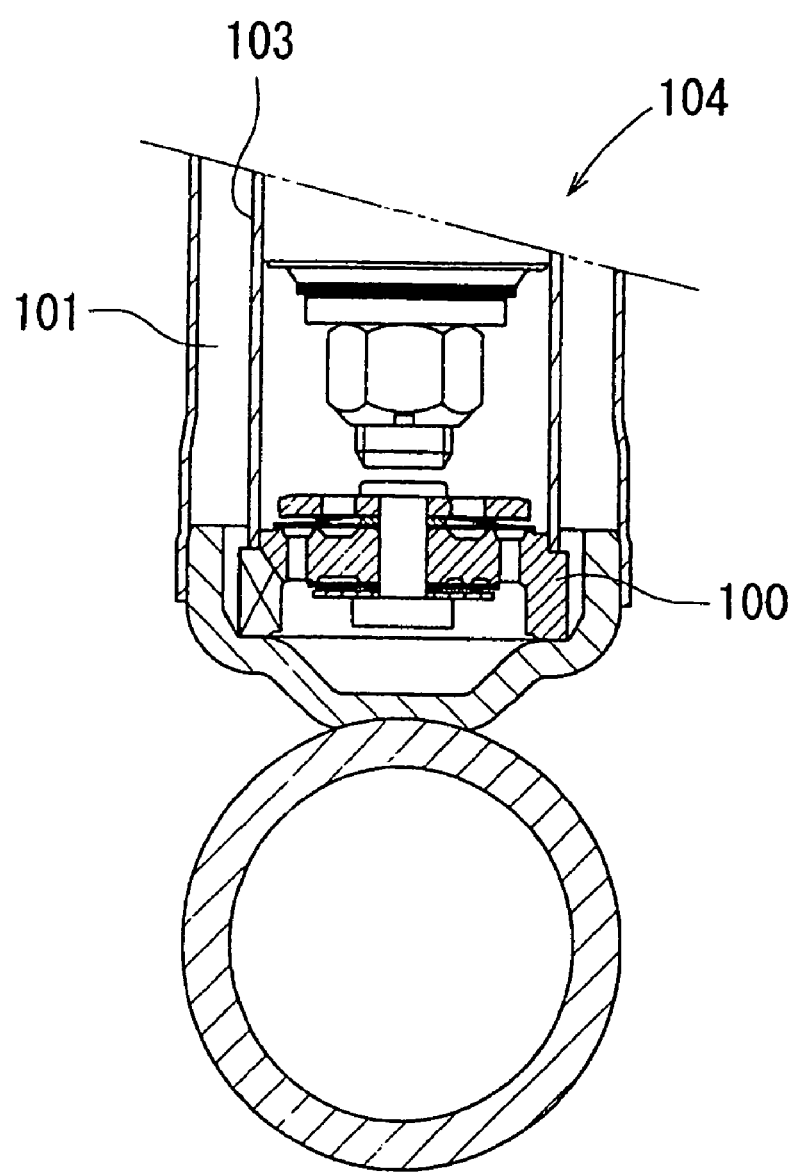
FIG. 6 is a fragmentary vertical sectional view showing a main part of a hydraulic shock absorber according to another embodiment of the present invention.

FIG. 6 is a fragmentary vertical sectional view of a hydraulic shock absorber according to another embodiment of the present invention. The hydraulic shock absorber 104 shown in the figure has a reservoir 101 having a hydraulic fluid or other liquid and a gas sealed therein. The inside of a cylinder 103 and the reservoir 101 are divided from each other by a base valve body 100 provided at one end of the cylinder 103. The hydraulic shock absorber 104 using the base valve body 100 as a valve body in this way can also implement the damping force characteristics shown in the foregoing embodiment.

Thus, the shock absorber of this embodiment is capable of reducing sharp changes in damping force and enables damping force characteristics to be set relatively easily.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-142867, filed on May 30, 2008.

The entire disclosure of Japanese Patent Application No. 2008-142867 filed on May 30, 2008 including specification, claims, drawings and summary is incorporated herein by reference in its entirety.

What is claimed is:

1. A shock absorber comprising:
a cylinder having a fluid sealed therein;
a piston slidably provided in the cylinder;
a piston rod connected to the piston and extending out of the cylinder;
a passage in which a flow of fluid is induced by sliding movement of the piston in the cylinder; and
a damping force generating mechanism having a disk valve provided in the passage;
the damping force generating mechanism comprising:
a valve body provided with an opening of the passage;
a circular main seat portion projecting from the valve body to surround the opening, the main seat portion forming a main valve chamber communicating directly with the passage, the disk valve being seated on the main seat portion;
a sub-seat portion projecting from the valve body toward the disk valve at an inner peripheral side of the main seat portion, the sub-seat portion forming, in cooperation with the main seat portion, a sub-valve chamber partitioned from the opening; and
a pressing member that presses the disk valve toward the main seat portion at the inner peripheral side of the main seat portion,
wherein the sub-seat portion comprises an arcuate portion concentric with the main seat portion and a radial portion extending radially from the arcuate portion to the main seat portion, the arcuate portion and the radial portion having a same projection height, the main valve chamber and the sub-valve chamber being always in communication with each other through a substantially triangular clearance defined between the radial portion and the disk valve.

2. The shock absorber of claim 1, wherein the sub-seat portion has a projection height less than that of the main seat portion.

3. The shock absorber of claim 2, wherein the valve body has a clamp portion provided at the inner peripheral side of the main seat portion to clamp the disk valve in cooperation with the pressing member, the clamp portion having a height not greater than that of the sub-seat portion.

4. The shock absorber of claim 2, wherein the damping force generating mechanism further comprises:
a second pressing member that presses the disk valve against the sub-seat portion.

5. The shock absorber of claim 4, wherein the second pressing member is a small-diameter disk having a diameter smaller than that of the main seat portion.

6. The shock absorber of claim 1, wherein the disk valve comprises a plurality of disks, one of the disks that abuts against the main seat portion being provided with a cut portion extending inward from an outer periphery thereof to communicate between the sub-valve chamber and an outside of the main valve chamber.

7. The shock absorber of claim 6, wherein an area with which the main valve chamber and the sub-valve chamber are always in communication with each other is larger than an area of the cut portion for generating a damping force.

8. The shock absorber of claim 1, wherein the damping force generating mechanism comprises a plurality of the openings and a plurality of the sub-seat portions, the openings being provided between circumferentially adjacent ones of the arcuate portions of the sub-seat portions, respectively.

9. The shock absorber of claim 1, wherein the valve body is the piston.

10. The shock absorber of claim 1, wherein a reservoir is connected to one end of the cylinder through a base valve body, the reservoir having a liquid and a gas sealed therein.

11. A shock absorber comprising:
a cylinder having a fluid sealed therein;
a piston slidably provided in the cylinder;
a piston rod connected to the piston and extending out of the cylinder; and
an extension damping force generating mechanism and a compression damping force generating mechanism that generate a damping force in response to sliding movement of the piston in the cylinder caused by extension and contraction of the piston rod;

the extension damping force generating mechanism including:

a first annular main seat portion projecting from one end of the piston;

an extension passage provided in the piston, one end of the extension passage having an opening inside the first annular main seat portion, the other end of the extension passage having an opening on an outer peripheral portion of the other end of the piston; and a disk valve clamped at an inner peripheral portion thereof by a clamp portion at a center of the one end of the piston, the disk valve being seated on the first annular main seat portion;

the compression damping force generating mechanism including:

a second annular main seat portion projecting from the other end of the piston at an inner peripheral side of the opening at the other end of the extension passage;

a compression passage provided in the piston, one end of the compression passage having an opening inside the second annular main seat portion, the other end of the compression passage having an opening at an outer peripheral side of the first annular main seat portion of the extension damping force generating mechanism on the one end of the piston; and a disk valve clamped at an inner peripheral portion thereof by a clamp portion at a center of the other end of the piston, the disk valve being seated on the second annular main seat portion;

at least one of the extension damping force generating mechanism and compression damping force generating mechanism further including:

an associated one of the first and second annular main seat portions that is circular in shape;

a sub-seat portion comprising an arcuate portion concentrically disposed at an inner peripheral side of the associated main seat portion and a radial portion extending radially from the arcuate portion to the associated main seat portion, the sub-seat portion defining a sub-valve chamber in a main valve chamber formed by the associated main seat portion, the sub-valve chamber being partitioned from the opening of the extension passage or the compression passage; and a spring member that presses the disk valve against the sub-seat portion;

the associated main seat portion having a projection height greater than that of the clamp portion, wherein the arcuate portion and the radial portion have a same projection height, and the main valve chamber and the sub-valve chamber are always in communication with each other through a substantially triangular clearance defined between the radial portion and the disk valve.

12. The shock absorber of claim 11, wherein a flow path is formed between the disk valve and the sub-seat portion to always communicate between the main valve chamber and the sub-valve chamber.

13. The shock absorber of claim 12, wherein there are provided a plurality of the sub-seat portions, the opening being provided between a pair of circumferentially adjacent ones of the arcuate portions of the sub-seat portions.

14. The shock absorber of claim 11, wherein the piston has a split structure comprising two axially split parts.

15. The shock absorber of claim 11, wherein the opening of each of the extension passage and compression passage that is disposed at an outer peripheral side of the first and second main seat portions is one of rectangular and arcuate in shape.

16. The shock absorber of claim 11, wherein the extension damping force generating mechanism and compression damping force generating mechanism are each provided with a sub-seat portion and a spring member.

17. A shock absorber comprising:

a cylinder having a fluid sealed therein;

a piston slidably provided in the cylinder;

a piston rod connected to the piston and extending out of the cylinder;

a passage in which a flow of fluid is induced by sliding movement of the piston in the cylinder; and a damping force generating mechanism provided in the passage;

the damping force generating mechanism including:

a valve body provided with an opening of the passage;

a circular main seat portion projecting from the valve body to surround the opening, the main seat portion forming a main valve chamber communicating directly with the passage;

a sub-seat portion projecting from the valve body, the sub-seat portion comprising an arcuate portion concentrically disposed at an inner peripheral side of the main seat portion and a radial portion extending from the arcuate portion to the main seat portion, the sub-seat portion defining in the main valve chamber a sub-valve chamber partitioned from the opening; and a disk valve clamped at an inner peripheral portion thereof by a clamp portion of the valve body, the disk valve being seated on both the main seat portion and the sub-seat portion;

wherein, at a beginning of opening of the disk valve, the fluid starts to flow out directly from the main valve chamber, and thereafter, an outflow of fluid through the sub-valve chamber begins, and wherein the disk valve and the radial portion form a clearance therebetween that always communicates between the main valve chamber and the sub-valve chamber, the clearance restricting a flow rate of fluid flowing out of the sub-valve chamber at the beginning of opening of the disk valve.

* * * * *